(12) United States Patent
Chuang (10) Patent No.: US 11,940,091 B1
(45) Date of Patent: Mar. 26, 2024

(54) ADJUSTABLE CLAMP WITH HIDDEN ADJUSTMENT STRUCTURE

(71) Applicant: EHOMA INDUSTRIAL CORPORATION, Taichung (TW)

(72) Inventor: Chun-Huan Chuang, Taichung (TW)

(73) Assignee: EHOMA INDUSTRIAL CORPORATION, Taichung (TW)

( * ) Notice: Subject to any disclaimer, the term of this patent is extended or adjusted under 35 U.S.C. 154(b) by 0 days.

(21) Appl. No.: 18/113,299

(22) Filed: Feb. 23, 2023

(51) Int. Cl.
  *F16M 13/02* (2006.01)
  *B25B 5/04* (2006.01)
  *B25B 5/10* (2006.01)

(52) U.S. Cl.
  CPC ............... *F16M 13/02* (2013.01); *B25B 5/04* (2013.01); *B25B 5/10* (2013.01)

(58) Field of Classification Search
  CPC .............. F16M 13/02; B25B 5/04; B25B 5/10
  See application file for complete search history.

(56) References Cited

U.S. PATENT DOCUMENTS

| | | | | |
|---|---|---|---|---|
| 2,589,520 | A * | 3/1952 | Jaakk .................... | F16M 13/02 248/177.1 |
| 2,726,694 | A * | 12/1955 | Saxton ................... | B25B 5/103 269/239 |
| 4,181,392 | A * | 1/1980 | Casler .................... | H01R 11/26 439/432 |
| 4,258,908 | A * | 3/1981 | Goff ....................... | B25B 5/103 269/239 |
| 6,893,012 | B2 * | 5/2005 | Wong ..................... | B25B 5/103 269/239 |
| 7,436,275 | B2 * | 10/2008 | Dale ....................... | B25B 5/103 333/260 |
| 8,794,612 | B2 * | 8/2014 | Chuang .................. | B25B 5/103 269/239 |
| 9,144,160 | B2 | 9/2015 | Chuang | |
| 11,697,189 | B2 * | 7/2023 | Chartier ................. | B25B 5/106 29/559 |
| 2015/0108306 | A1 * | 4/2015 | Chuang ................. | F16M 11/14 248/231.51 |

* cited by examiner

*Primary Examiner* — Anita M King
(74) *Attorney, Agent, or Firm* — WPAT, P.C (57) ABSTRACT

An adjustable clamp with hidden adjustment structure includes a first clamp body, a second clamp body, and an adjustment device. The adjustment device is disposed between the first and the second clamp bodies for adjusting the clamp opening size therebetween to clamp an object. The adjustment device includes a first screw member, a second screw member, and a support member. The support member is disposed on the first clamp body. The first screw member is disposed on the second clamp body. The second screw member is slidably disposed on the support member and screwedly combined with the first screw member. When the second screw member is rotated, the first screw member generates a linear movement with respect to the second screw member. The originally exposed length of the second screw member does not change, causing no inconvenience of usage, and achieving a hidden adjustment function.

12 Claims, 8 Drawing Sheets

ADJUSTABLE CLAMP WITH HIDDEN ADJUSTMENT STRUCTURE

BACKGROUND OF THE INVENTION

1. Field of the Invention

The present invention relates to clamps, and more particularly, to an adjustable clamp with hidden adjustment structure.

2. Description of the Related Art

Referring to U.S. Pat. No. 9,144,160, a digital product holder is disclosed. The digital product holder comprising a first arm, a second arm, a thread rod, and a fixing assembly. The second arm is pivotally combined with the first arm. The thread rod is rotatably disposed between the first and the second arms, allowing the clamp end of the first arm and the clamp end of the second arm to open and close for clamping an object. Therein, the fixing assembly is disposed on the second arm for combining a digital product, so as to fix the digital product at an appropriate position.

With one end of the thread rod connected with the second arm, and the cooperation of the outer thread of the thread rod and the thread bore of the first arm, when the thread rod rotates for the clamp end of the first arm and the clamp end of the second arm to open with respect to each other, the length of the exposed outer portion (adjustment end) of the thread rod increases according to the open degree of the two clamp ends. Therefore, if the patent above is applied to transportations such as motorcycle and bicycle, when the motorcycle or bicycle turns, the thread rod easily contacts the body of the vehicle or the body of the rider, causing the inconvenience and danger of usage.

SUMMARY OF THE INVENTION

To improve the issues above, the present invention discloses an adjustable clamp with hidden adjustment structure. When the size of the clamp opening increases, the originally exposed length of the second screw member does not change, preventing the inconvenience of usage and achieving the hidden adjustment function.

For achieving the aforementioned objectives, an adjustable clamp with hidden adjustment structure is provided, comprising a first clamp body, a second clamp body, and an adjustment device. The first clamp body comprises a first clamp end and a first combination part. The second clamp body is pivotally disposed on the first clamp body and comprises a second clamp end and a second combination part. The adjustment device is disposed between the first clamp body and the second clamp body for adjusting the opening degree of the first clamp end and the second clamp end to clamp an object. Also, the adjustment device comprises a first screw member, a second screw member, and a support member. The support member is pivotally disposed on the first combination part and comprises a through hole. The first screw member is disposed on the second combination part and comprises a first screwing part. The second screw member is slidably disposed in the through hole and comprises an adjustment end and a second screwing part. The first screwing part is screwed to the second screwing part. When the adjustment end is rotated, the first screw member generates a linear movement with respect to the second screw member, thereby adjusting the opening and closing of the first clamp end and the second clamp end.

With such configuration, when the user adjusts the clamp opening size of the first clamp body and the second clamp body through the adjustment device, the length of the second screw member originally exposed out of the clamp does not change, and the first screw member is prevented from being exposed out of the second screwing part of the second screw member, so as to achieve the hidden adjustment function of the clamp opening, avoiding inconvenience and possible danger of usage.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, an adjustable clamp 100 with hidden adjustment structure in accordance with the first embodiment of the present invention is provided, comprising a first clamp body 10, a second clamp body 20, and an adjustment device 30. Through the adjustment device 30, the clamp opening between the first clamp body 10 and the second clamp body 20 is adjusted for clamping objects with different thicknesses.

Figure 1:
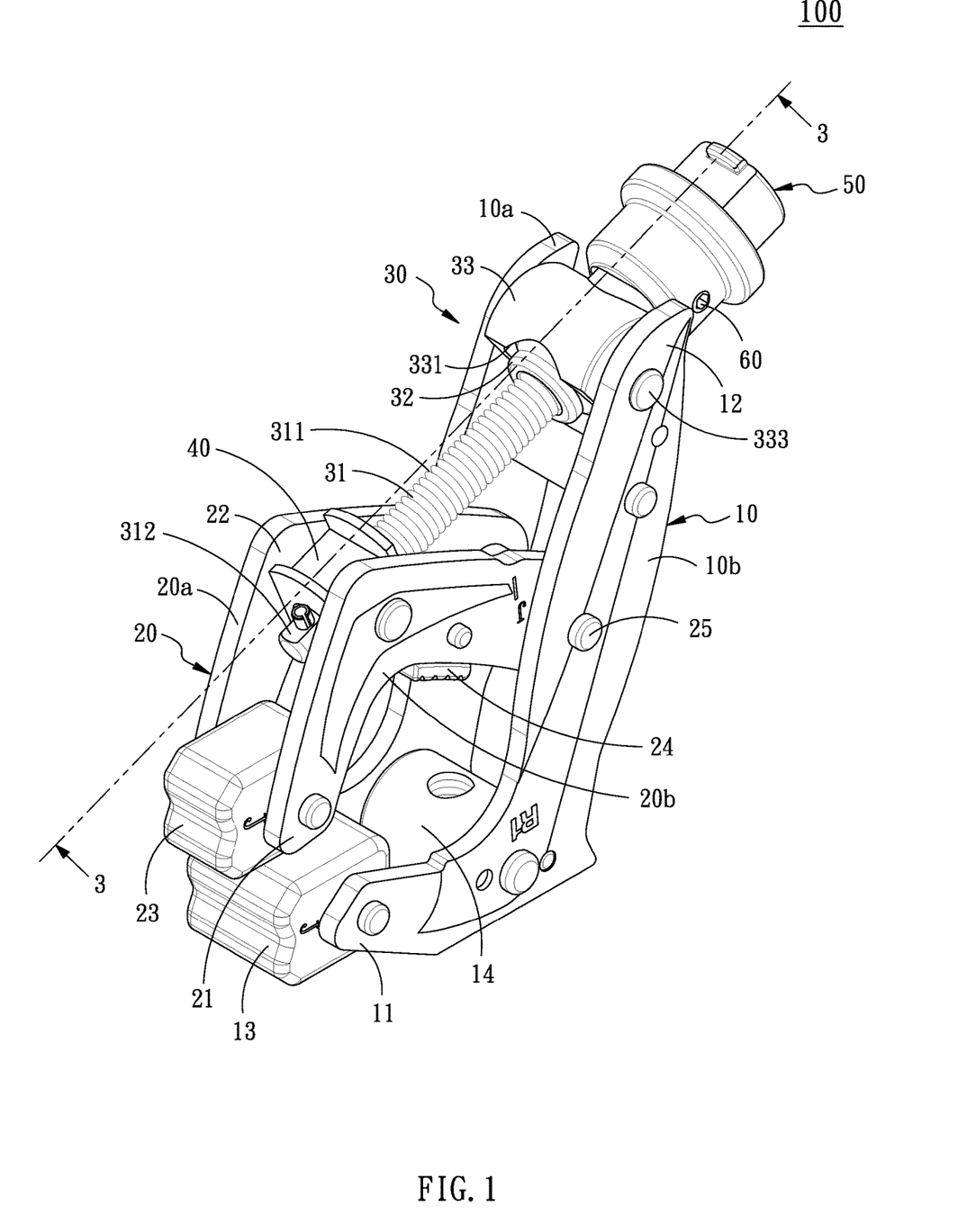
FIG. 1 is a perspective view of the adjustable clamp with hidden adjustment structure in accordance with the first embodiment of the present invention.
Figure 2:
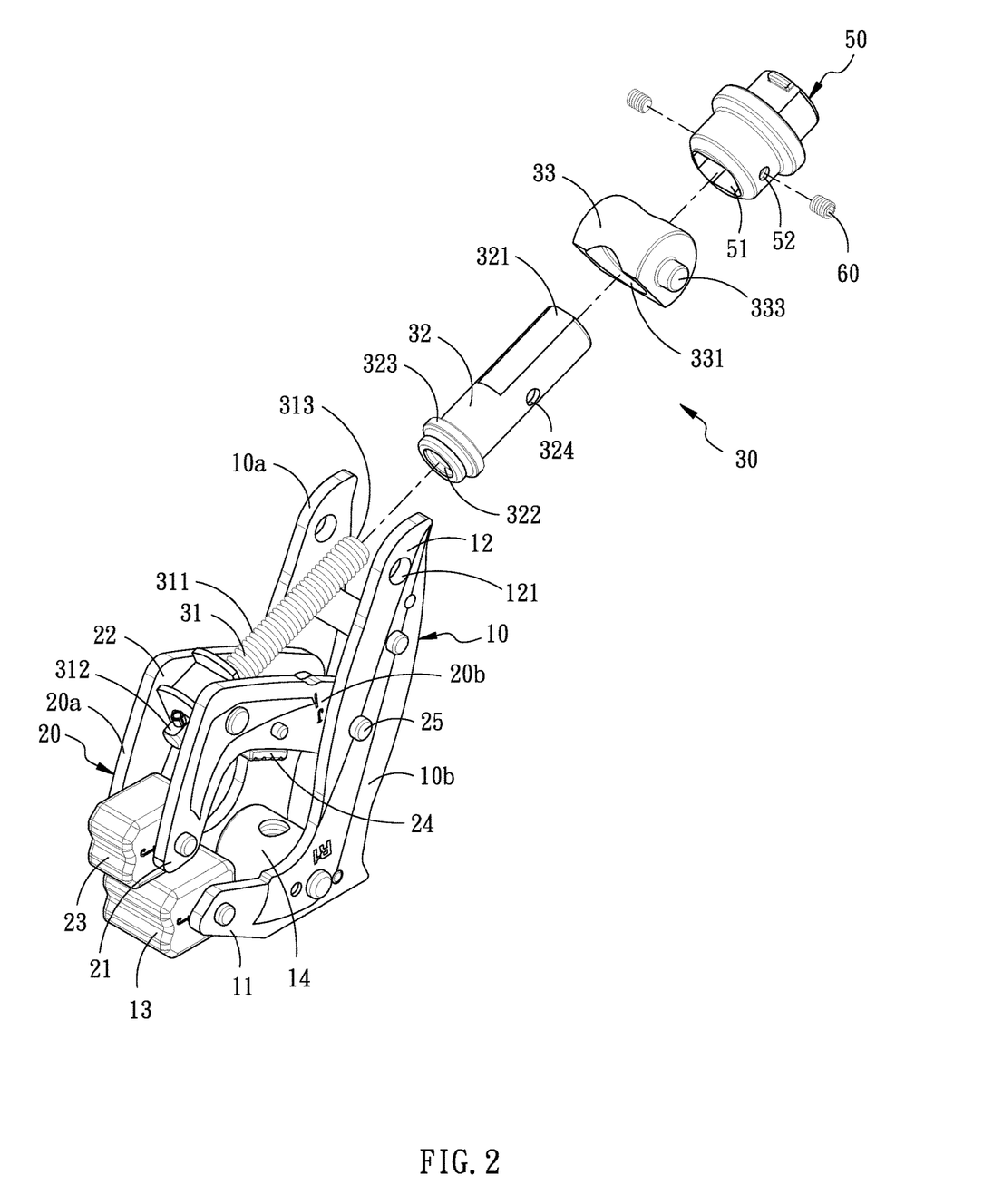
FIG. 2 is a partially exploded view of the adjustable clamp with hidden adjustment structure in accordance with the first embodiment of the present invention.

The first clamp body 10 is formed of two metal plates 10a, 10b symmetrically disposed and equidistantly combined together. The first clamp body 10 comprises a first clamp end 11 and a first combination part 12 formed away therefrom. The first clamp end 11 comprises a first clamp block 13 pivotally disposed thereon. Also, the first clamp body 10 further comprises an installation part 14. The installation part 14 is allowed to be combined with a transition seat (not shown in the figures), through which an electronic product (such as a cell phone or camera) is positioned on the adjustable clamp 100.

The second clamp body 20 is formed of two metal plates 20a, 20b symmetrically disposed and equidistantly combined together. The second clamp body 20 comprises a second clamp end 21 and a second combination part 22 formed away therefrom. The second combination part 22 comprises a positioning member 40. The second clamp end 21 comprises a second clamp block 23 pivotally disposed thereon. The second clamp body 20 further comprises a support block 24 disposed away from the second clamp block 23. When the first clamp block 13 on the first clamp body 10 and the second clamp block 23 on the second clamp body 20 cooperatively clamp an object, the support block 24 provides an assistant supporting effect to the object. Besides, the second clamp body 20 is pivotally disposed on the first clamp body 10 through an axle member 25, and the second clamp body 20 is arranged between the two metal plates 10a, 10b.

The adjustment device 30 is disposed between the first clamp body 10 and the second clamp body 20 for adjusting the opening and closing of the first clamp end 11 and the second clamp end 21 with respect to each other, facilitating the object clamping process. The adjustment device 30 comprises a first screw member 31, a second screw member 32, and a support member 33.

The support member 33 is pivotally disposed on the first combination part 12. In the embodiment, each of two sides of the support member 33 comprises a protrusion part 333 pivotally disposed in a bore 121 formed on the first combination part 12 of the first clamp body 10, such that the support member 33 is arranged between the metal plates 10a, 10b. Therein, the support member 33 comprises a through hole 331.

The first screw member 31 comprises a first screwing part 311, which is a thread rod. The first screw member 31 comprises a connection part 312 disposed away from the first screwing part 311. The length of the first screwing part 311 is larger than the length of the connection part 312, and the connection part 312 passes through the positioning member 40. The thread rod comprises a terminal end 313.

The second screw member 32 is slidably disposed in the through hole 331. The second screw member 32 comprises an adjustment end 321 and a second screwing part 322. The second screwing part 322 is a thread bore arranged in the axial direction of the second screw member 32. The second screwing part 322 and the first screwing part 311 are screwedly combined, such that the thread bore is in cooperation with the thread rod. Therefore, when the adjustment end 321 is rotated, the first screw member 31 generates a linear movement with respect to the second screw member 32, facilitating the adjustment of the opening and closing of the first clamp end 11 and the second clamp end 21 with respect to each other.

Figure 3:
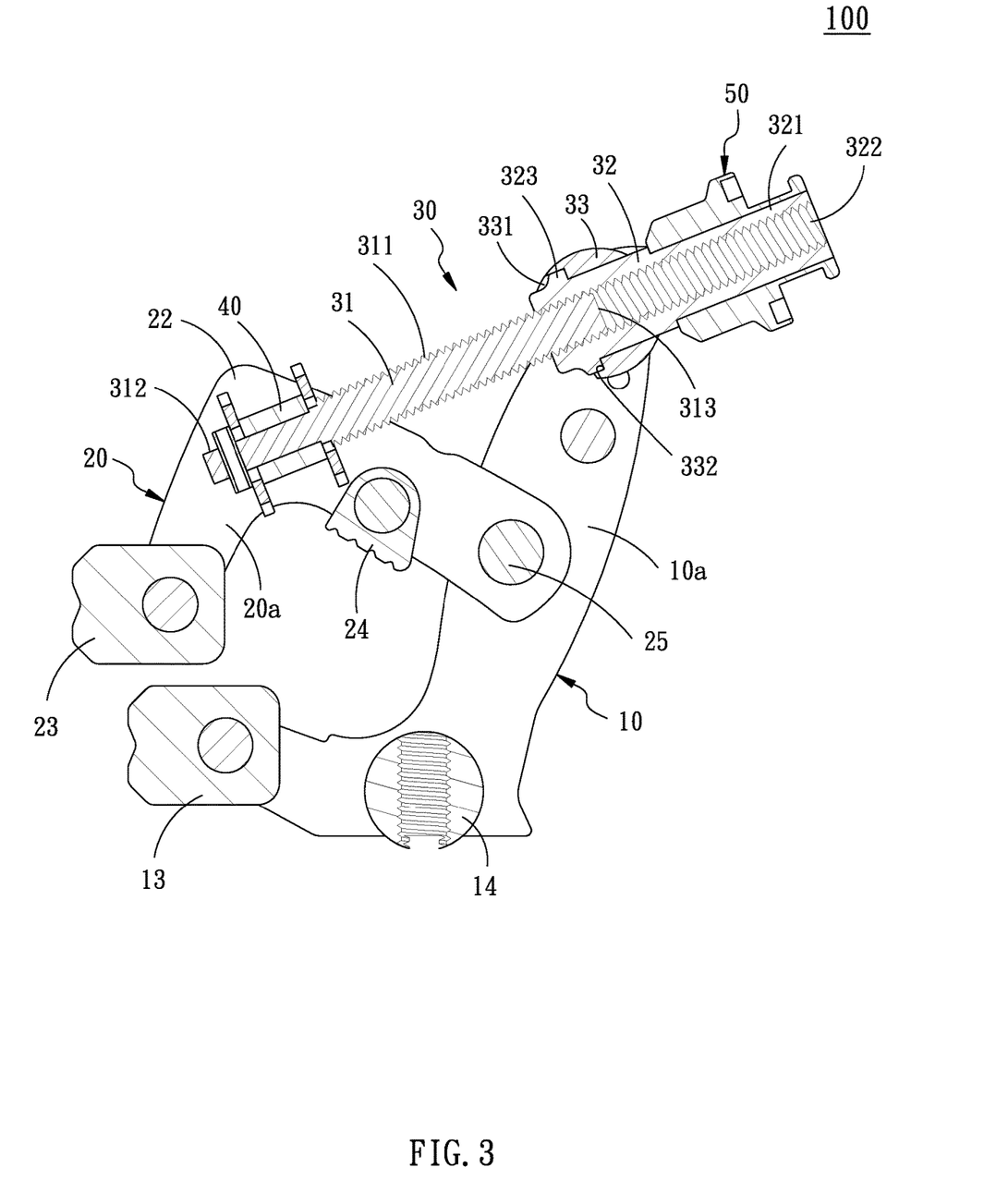
FIG. 3 is a cross-sectional view taken along line 3-3 of FIG. 1, illustrating the clamp opening size between the first clamp body and the second clamp body being relatively small before the adjustment of the clamp opening.
Figure 4:
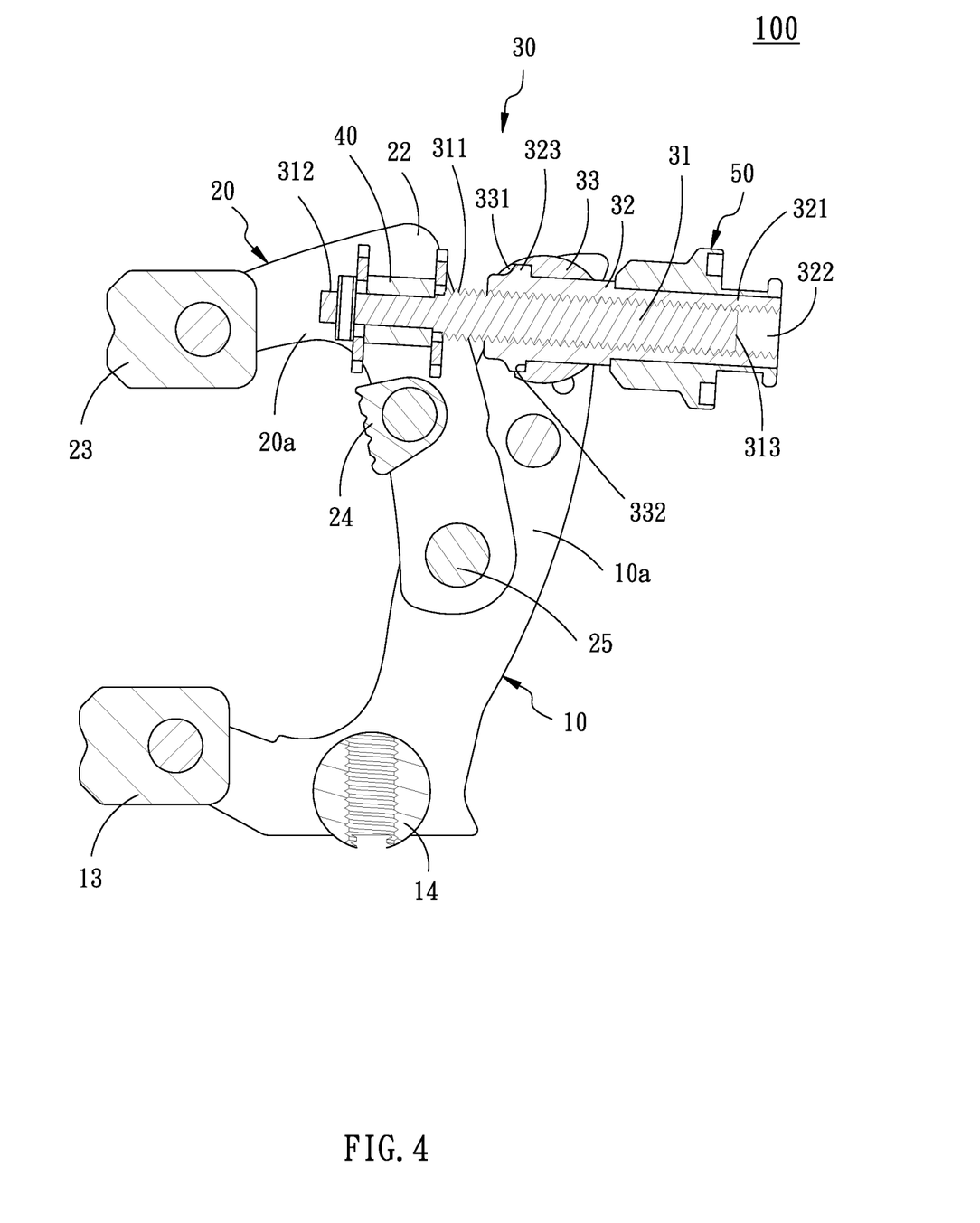
FIG. 4 is a transverse cross-sectional view of the adjustable clamp with hidden adjustment structure in accordance with the first embodiment of the present invention, illustrating the clamp opening size between the first clamp body and the second clamp body becoming relative larger after the adjustment of the clamp opening.
Figure 5:
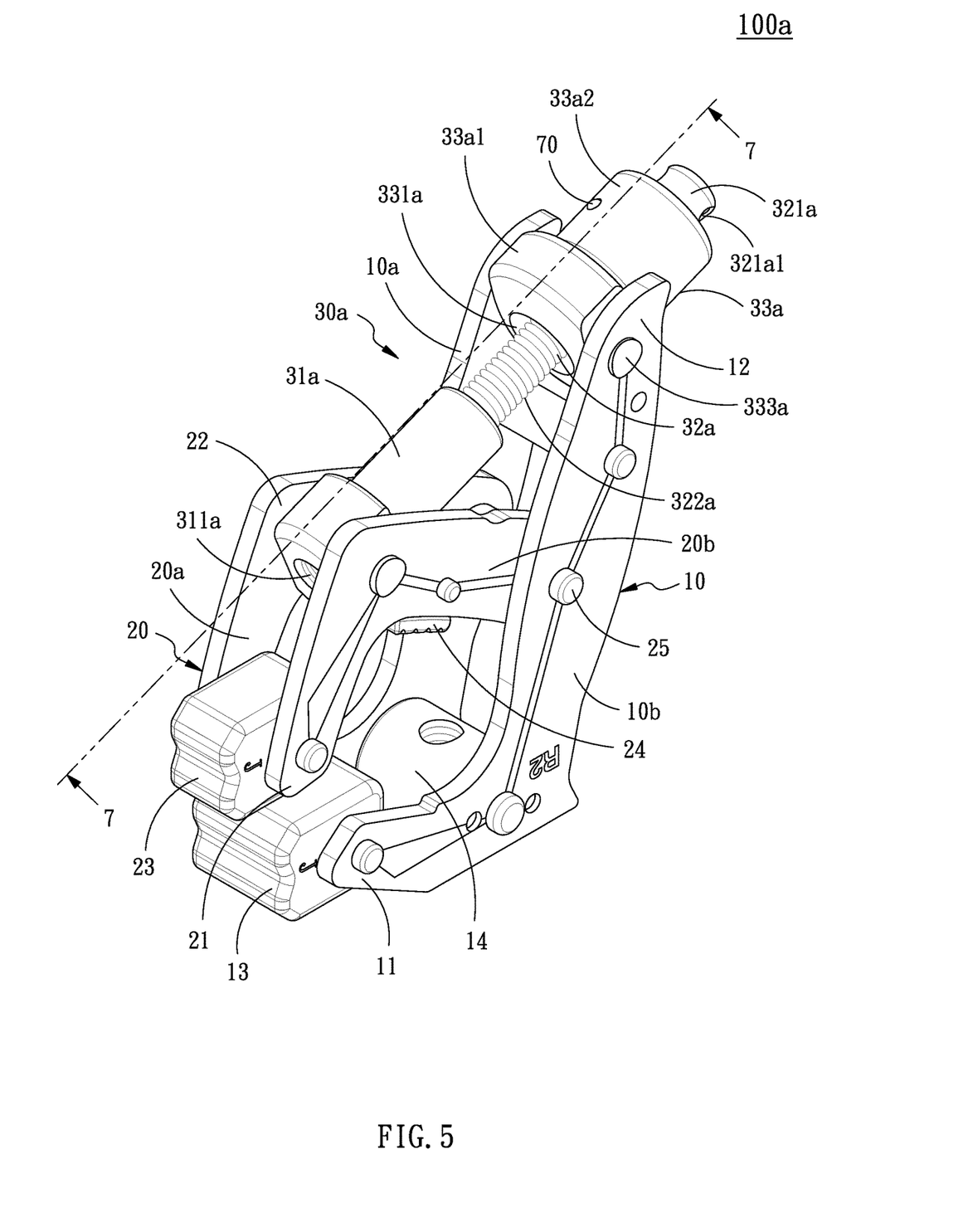
FIG. 5 is a perspective view of the adjustable clamp with hidden adjustment structure in accordance with the second embodiment of the present invention.

In the first embodiment, the second screw member 32 comprises a first stop part 323 disposed away from the adjustment end 321. The support member 33 comprises a second stop part 332 disposed on one end of the through hole 331 for stopping the first stop part 323. Accordingly, when the first clamp end 11 and the second clamp end 21 of the present invention open with respect to each other, the stopping relationship between the first stop part 323 and the second stop part 332 prevents the terminal end 313 from being exposed from the said thread bore, so that the terminal end 313 is only linearly movable within the thread bore.

In the first embodiment, the second screw member 32 comprises a driving member 50 disposed on the adjustment end 321 in a non-rotatable manner. The driving member 50 comprises a non-circular bore 51, and the adjustment end 321 comprises a non-circular sectional face. As shown by FIG. 2, two sides of the adjustment end 321 are formed in a plane shape. When the driving member 50 is mounted around the adjustment end 321 through the non-circular bore 51, the driving member 50 is prevented from rotating, such that the user is allowed to rotate the driving member 50 for adjusting the clamp opening size. Furthermore, the present invention comprises at least one anti-theft screw 60. The anti-theft screw 60 is a set screw, transversely screwed through a thread bore 52 of the driving member 50 and a positioning bore 324 of the second screw member 32, whereby the driving member 50 is fastened to the adjustment end 321. Due to the outer diameter of the driving member 50 being larger than the through hole 331, and the functions of the first stop part 323 and the second stop part 332, the second screw member 32 is prevented from detaching with respect to the support member 33, thereby achieving an anti-theft effect.

Referring to FIG. 3 and FIG. 4, during the usage, the user adjusts the clamp opening size between the first clamp body 10 and the second clamp body 20 through the adjustment device 30 for clamping the target object such as a motorcycle to be positioned thereon. The user rotates the driving member 50 to trigger the rotation of the second screw member 32. Through the screwing rotation relationship of the second screwing part 322 and the first screwing part 311, the first screw member 31 generates a linear movement with respect to the second screw member 32, such that the second combination part 22 moves closer toward the first combination part 12, thereby adjusting the clamp opening of the adjustable clamp 100 from the closing position in FIG. 3 to the opening position in FIG. 4, so that the clamp opening of the adjustable clamp 100 is adjusted to open. In contrast, when the user reversely rotates the driving member 50, the clamp opening of the adjustable clamp 100 is adjusted to be smaller. Accordingly, the size of the clamp opening is adjusted, and the adjustable clamp 100 is able to clamp objects with different thicknesses. With the aforementioned structure and adjustment method, the linear movement of the second screw member 32 with respect to the first screw member 31 is adjusted, and the length of the second screw member 32 originally exposed out of the adjustable clamp 100 does not change. Therefore, the length of the first screw member 31 is able to be arranged shorter, and the first screw member 31 is prevented from being exposed out of the second screwing part 322 of the second screw member 32, achieving the hidden adjustment function, and preventing the interference of the first screw member 31 upon the motorcycle or preventing the first screw member 31 from contacting the body of the rider, thereby avoiding the inconvenience and possible danger of usage.

Referring to FIG. 5 to FIG. 8, the adjustable clamp 100a with hidden adjustment structure in accordance with the second embodiment of the present invention is provided. The second embodiment is structurally similar to the first embodiment, wherein the differences are that the first screwing part 311a of the first screw member 31a of the adjustment device 30a is a thread bore, and the second screwing part 322a of the second screw member 32a is a thread rod.

Figure 6:
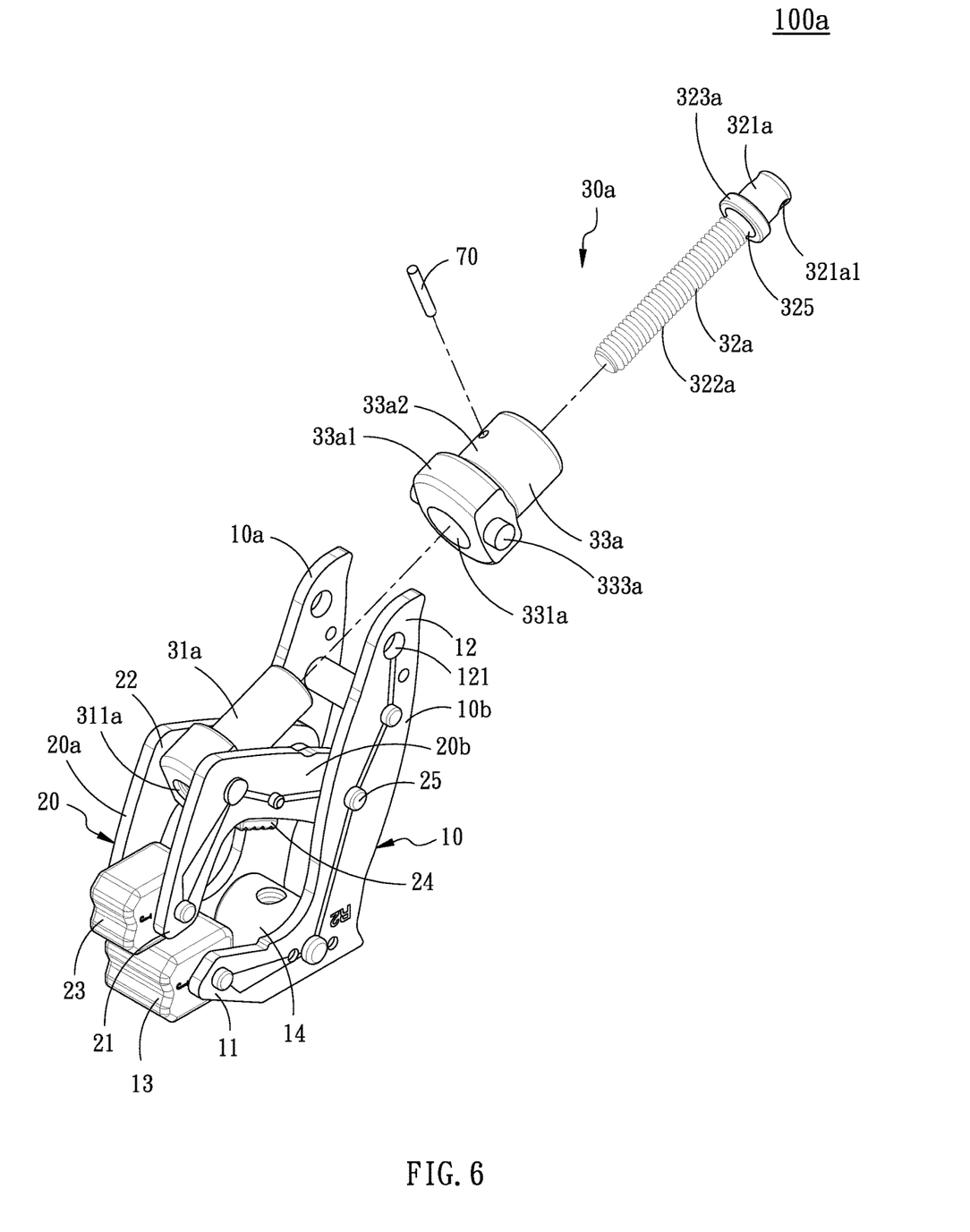
FIG. 6 is a partially exploded view of the adjustable clamp with hidden adjustment structure in accordance with the second embodiment of the present invention.
Figure 7:
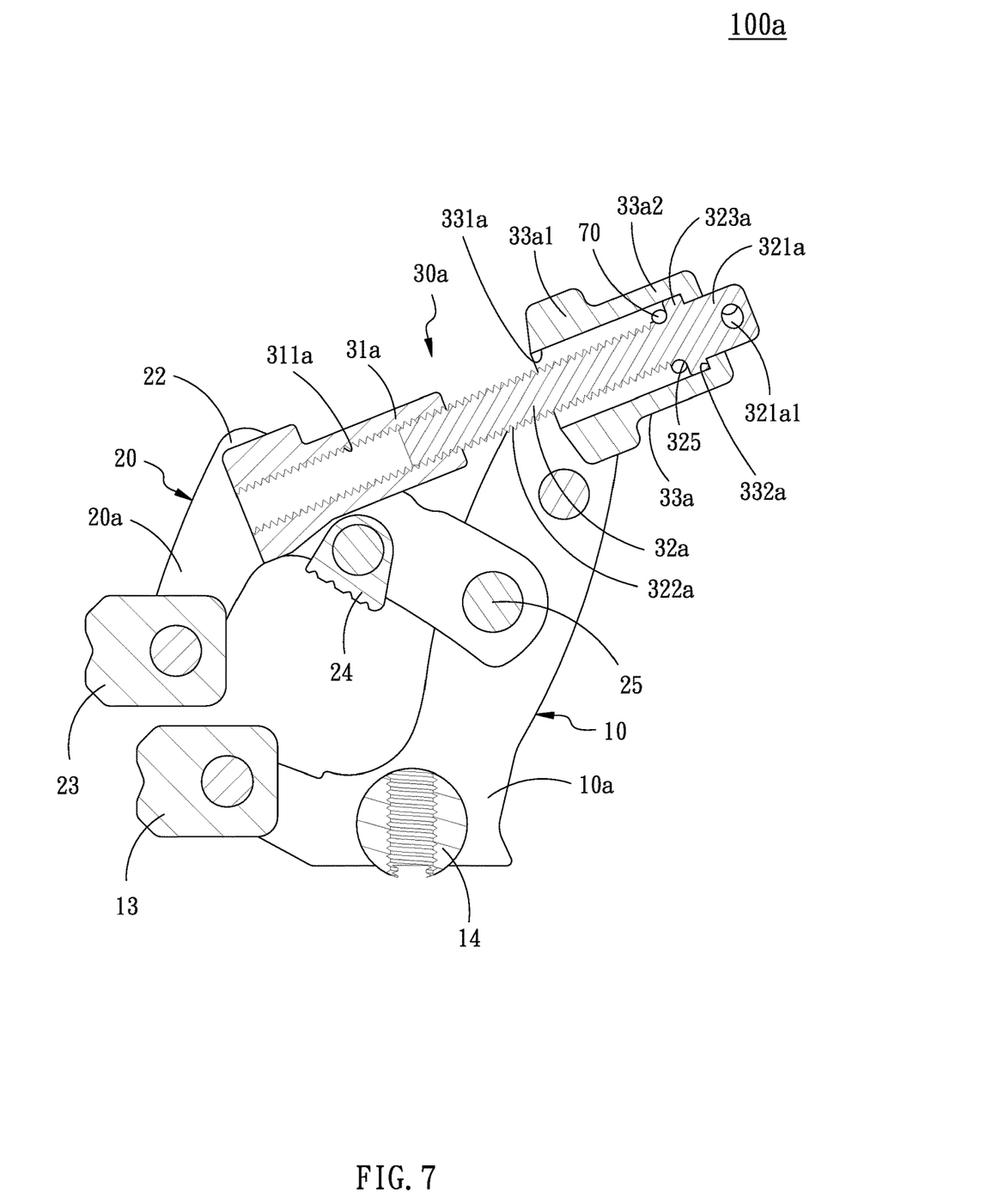
FIG. 7 is a cross-sectional view taken along line 7-7 of FIG. 5, illustrating the clamp opening size between the first clamp body and the second clamp body being relatively small before the adjustment of the clamp opening.

The first stop part 323a is disposed between the adjustment end 321a and the second screwing part 322a of the second screw member 32a. The second stop part 332a is disposed in the inner side of the through hole 331a of the support member 33a. The second stop part 332a is applied for stopping the first stop part 323a.

Each of two sides of the support member 33a comprises a protrusion part 333a pivotally disposed in the bore 121 formed on the first combination part 12 of the first clamp body 10, such that the support member 33a is arranged between the metal plates 10a, 10b. Also, the support member 33a comprises a position limiting member 70 transversely disposed thereon, and the position limiting member 70 is formed in a circular rod shape. The first stop part 323a comprises a groove 352 circularly formed on one side thereof for receiving the position limiting member 70. The position limiting member 70 is configured to stop the first stop part 323a. Further, the support member 33a comprises a first end 33a1 and a second end 33a2, with the through hole 331a disposed between the first end 33a1 and the second end 33a2. The first end 33a1 is axially arranged on the first combination part 12. The adjustment end 321a is exposed from the through hole 331a, and comprises an adjustment bore 321a1 through which a circular rod or a circular bar passes for driving the adjustment end 321a, thereby achieving the clamp opening adjustment purpose and function.

Figure 8:
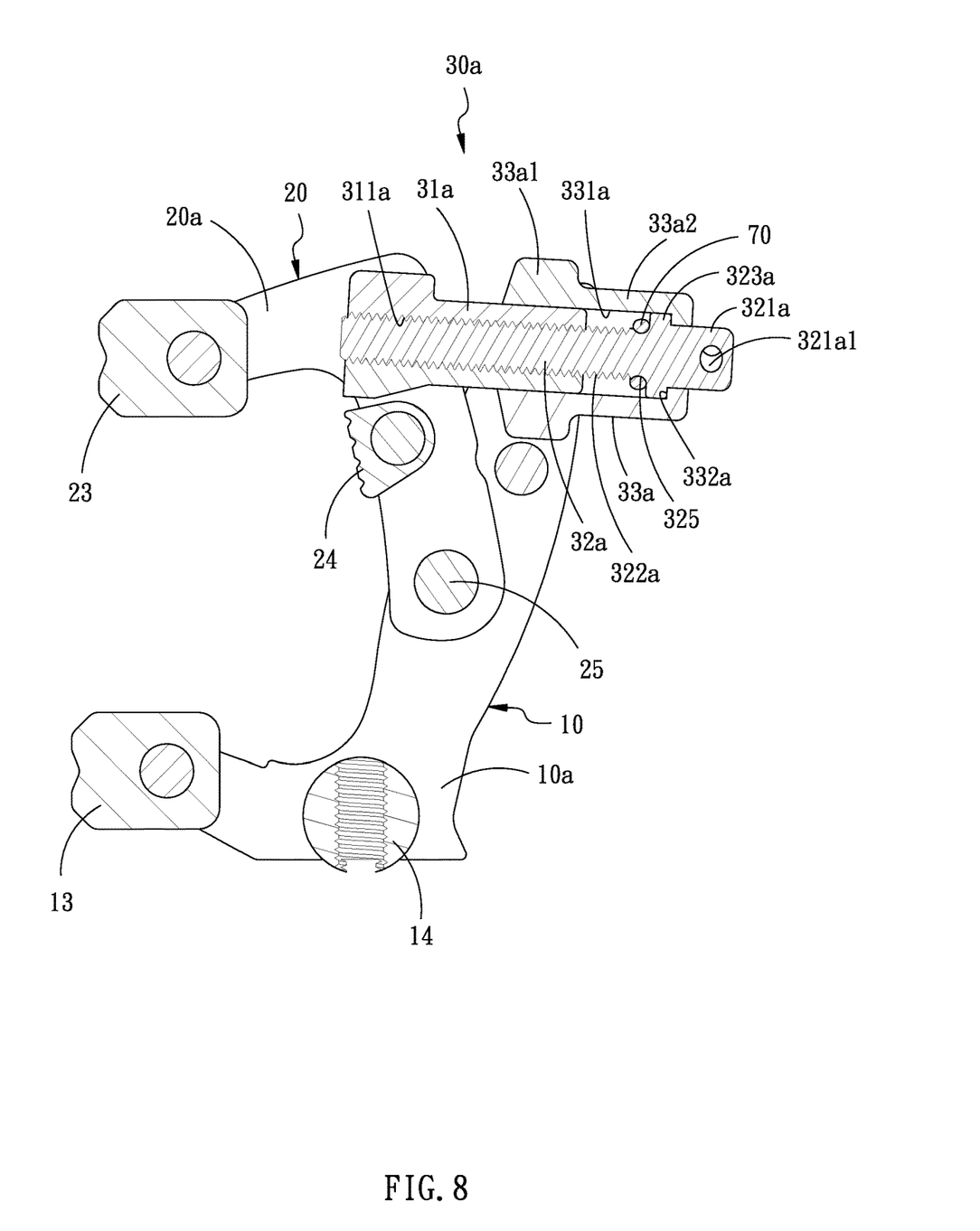
FIG. 8 is a transverse cross-sectional view of the adjustable clamp with hidden adjustment structure in accordance with the second embodiment of the present invention, illustrating the clamp opening size between the first clamp body and the second clamp body becoming relative larger after the adjustment of the clamp opening.

Similar to the adjustment process of the aforementioned first embodiment, when the first clamp end 11 and the second clamp end 21 are adjusted for opening and closing, the second stop part 332a stops the first stop part 323a, so as to prevent the second screwing part 322a from being exposed out of the second end 33a2 of the support member 33a. Therefore, during the usage of the second embodiment, the length of the second screw member 32a originally exposed out of the adjustable clamp 100a does not change, and the second screwing part 322a of the second screw member 32a is prevented from being exposed from the support member 33a, either before or after the adjustment process of the clamp opening, thereby preventing the second screw member 32a from interfering the motorcycle or contacting the body of the rider, avoiding possible danger.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An adjustable clamp with hidden adjustment structure, comprising:
   a first clamp body comprising a first clamp end and a first combination part;
   a second clamp body pivotally disposed on the first clamp body, and comprising a second clamp end and a second combination part; and
   an adjustment device disposed between the first clamp body and the second clamp body to adjust the first clamp end and the second clamp end to open and close with respect to each other for clamping an object, the adjustment device comprising a first screw member, a second screw member, and a support member;
   the support member pivotally disposed on the first combination part, and comprising a through hole;
   the first screw member disposed on the second combination part, and comprising a first screwing part;
   the second screw member slidably disposed in the through hole, and comprising an adjustment end and a second screwing part, the first screwing part being screwedly combined with the second screwing part, such that when the adjustment end is rotated, the first screw member generates a linear movement with respect to the second screw member for adjusting the first clamp end and the second clamp end to open and close with respect to each other.

2. The adjustable clamp of claim 1, wherein the first screwing part is a thread rod, and the second screwing part is a thread bore.

3. The adjustable clamp of claim 2, wherein the second screw member comprises a driving member disposed on the adjustment end in a non-rotatable manner.

4. The adjustable clamp of claim 3, wherein the adjustment end comprises a sectional face formed in a non-circular shape, and the driving member comprises a non-circular bore mounted around the adjustment end.

5. The adjustable clamp of claim 3, further comprising an anti-theft screw transversely screwed through the driving member and the second screw member.

6. The adjustable clamp of claim 2, wherein the second screw member comprises a first stop part disposed away from the adjustment end, and the support member comprises a second stop part disposed on one end of the through hole for stopping the first stop part.

7. The adjustable clamp of claim 6, wherein the thread rod comprises a terminal end; when the first clamp end and the second clamp end are adjusted to open and close, the terminal end is not exposed from the thread bore; the first screw member comprises a connection part disposed away from the first screwing part, and the second combination part comprises a positioning member; the connection part passes through the positioning member.

8. The adjustable clamp of claim 1, wherein the first screwing part is a thread bore, and the second screwing part is a thread rod.

9. The adjustable clamp of claim 8, wherein a first stop part is disposed between the adjustment end and the second screwing part, and a second stop part is disposed in an inner side of the through hole for stopping the first stop part.

10. The adjustable clamp of claim 9, wherein the support member comprises a position limiting member transversely disposed thereon for stopping the first stop part; the support member comprises a first end and a second end, and the through hole is disposed between the first end and the second end; the first end is axially arranged on the first combination part, and the adjustment end is exposed from the through hole; when the first clamp end and the second clamp end are adjusted to open and close, the second screwing part is not exposed from the second end.

11. The adjustable clamp of claim 10, wherein the position limiting member is formed in a circular rod shape; the first stop part comprises a groove circularly formed on one side thereof for receiving the position limiting member.

12. The adjustable clamp of claim 1, wherein the first clamp end comprises a first clamp block pivotally disposed thereon, the second clamp end comprises a second clamp block pivotally disposed thereon, and the second clamp body comprises a support block disposed away from the second clamp block.

* * * * *